United States Patent [19]
Beach et al.

[11] Patent Number: 5,489,771
[45] Date of Patent: Feb. 6, 1996

[54] LED LIGHT STANDARD FOR PHOTO- AND VIDEOMICROSCOPY

[75] Inventors: James M. Beach; Brian R. Duling, both of Charlottesville, Va.

[73] Assignee: University of Virginia Patent Foundation, Charlottesville, Va.

[21] Appl. No.: 137,827

[22] Filed: Oct. 15, 1993

[51] Int. Cl.⁶ .......................... H05B 35/00; H05B 37/00
[52] U.S. Cl. .......................... 250/205; 315/181; 315/182; 315/183; 315/180
[58] Field of Search .......................... 250/205; 315/181, 315/182, 183, 178, 179, 180

[56] References Cited

U.S. PATENT DOCUMENTS

| | | | |
|---|---|---|---|
| 4,284,884 | 8/1981 | Dyment et al. | 250/205 |
| 4,292,513 | 9/1981 | Simmons et al. | 250/205 |
| 5,374,876 | 9/1994 | Houhata et al. | 315/178 |

Primary Examiner—William L. Sikes
Assistant Examiner—Fetsum Abraham
Attorney, Agent, or Firm—Sheldon H. Parker

[57] ABSTRACT

The invention relates to a light calibration system consisting of a compact LED source with feedback control of intensity. The source is positioned in the focal plane of the microscope objective and produces flat-field illumination of up to 31 microwatts. The source can be easily used to determine the performance of microscope optics and camera response. It can also be used as a standard light source for calibration of experimental systems. Selectable light intensities are produced by controlling the LED input power via a feedback circuit consisting of a photodiode that detects output light intensity. Spectral coverage extends between 550 nm and 670 nm using green, yellow and red LEDS mounted side-by-side and which are individually selected. The LED chips are encapsulated in plastic diffusers which homogenize the light, and a flat field of illumination is obtained through a thin 1 mm diameter aperture positioned directly over each chip. Provision is made for insertion of Ronchi rulings over the aperture to enable measurements of contrast modulation in a uniform field. The light can be pulse-modulated to assess camera response times and the device can be synchronized with video frames. Narrow bandpass interference filters can be placed between the objective lens and the LED source to produce monochromatic light without affecting the spacing of controlled light intensities since emission spectra do not appreciably shift over the range of LED powers chosen in this design.

20 Claims, 5 Drawing Sheets

LED LIGHT STANDARD FOR PHOTO- AND VIDEOMICROSCOPY

This invention was made with Government support under Contract HL12792 awarded by the National Institute of Health. The Government has certain rights in this invention.

BACKGROUND OF THE INVENTION

1. Field of the Invention

The invention relates to a light calibration system consisting of a compact LED source with feedback control of intensity.

2. Brief Description of the Prior Art

Where photo- or video microscopy are employed as analytical techniques, a light standard providing preset levels of intensity over a homogeneous field covering the viewing area of a microscope is a useful accessory for system validation and testing. Functional studies of cell biolog routinely seek information about cellular activity by means of video imaging, using image sequences to monitor correlated cellular actions, such as calcium flux transients in relation to force generation in muscle cells. Quantitative information concerning intracellular ion concentration changes are obtained, in theory, using ratio imaging techniques, permitting degrees of cellular activity to be compared.

The reliability of photomicroscopic assays depends on accurate translation of light intensities, some of which are exceedingly faint, into pixel brightness levels. Unfortunately, video detection systems and accessories employed for low light recording cause distortions of both brightness and geometry in the image. Photoelectron multipliers in SIT and intensified SIT cameras exhibit nonlinear response at light levels below saturation. Electrostatically focused SIT cameras are subject to "shading" and "pincushioning". Pincushion distortion can vary over the range of intensification, while shading appears to vary slightly with average illumination in some cameras (unpublished data). These effects complicate the task of insuring the photometric accuracy of images obtained under different recording conditions. Newer solid-state microchannel plate intensifiers used with CCD cameras, which are free from shading and pin cushion effects, still are nonlinear and often impose onto the low light image a repeating pattern of varying intensity (chicken wire pattern) caused by the array of microchannels. The several forms of image distortion must be identified and corrected, or at least shown to be insignificant, before quantitative information can be obtained using photomicroscopy.

To aid in assessing the optical performance of photo- and video-microscopes as well as the reproducibility of recordings, standard light sources have been developed which are based on fluorescent microbeads, solid blocks and fluorescein filled glass capillary tubes. Beads permit the user to determine the degree to which the optical system faithfully images small three dimensional objects. Solid standards, such as uranyl glass and polymethacrylate blocks containing anthracene or rhodamine B (Starma Cells Inc.), undergo almost no photobleaching and are thus excellent tools to monitor fluctuations in excitation light levels. Solid standards have also been used to generate uniformly fluorescent fields from which to correct camera shading functions. Capillary tubes or cuvettes filled with known concentrations of fluorophores are used to characterize camera linearity, and can provide light intensities in absolute units with known excitation power, although in some cases the emission must be corrected for anisotropy. As useful as they are for quantitative work, chemical standards present some practical difficulties. The light output is subject to lamp noise from power fluctuations and aging of the burner. In addition, the solutions must be duplicated exactly to serve as calibration light sources, thus their preparation is both time consuming and difficult. Furthermore, most chemical standards show moderate photobleaching with use. Here we describe a solid-state light standard, employing feedback controlled light emitting diodes of differing wavelength, which does not have the disadvantages of chemical standards, and can serve both as a source of calibrated light and flat-field illumination.

SUMMARY OF THE INVENTION

The invention relates to a light calibration system consisting of a compact LED source with feedback control of intensity. The source is positioned in the focal plane of the microscope objective and produces flat-field illumination of up to 31 microwatts. The source can be easily used to determine the performance of microscope optics and camera response. It can also be used as a standard light source for calibration of experimental systems. Selectable light intensities are produced by controlling the LED input power via a feedback circuit consisting of a photodiode that detects output light intensity. Spectral coverage extends between 550 nm and 670 nm using green, yellow and red LEDS mounted side-by-side and which are individually selected. The LED chips are encapsulated in plastic diffusers which homogenize the light, and a flat field of illumination is obtained through a thin 1 mm diameter aperture positioned directly over each chip. Provision is made for insertion of Ronchi rulings over the aperture to enable measurements of contrast modulation in a uniform field. The light can be pulse-modulated to assess camera response times and the device can be synchronized with video frames. Narrow bandpass interference filters can be placed between the objective lens and the LED source to produce monochromatic light without affecting the spacing of controlled light intensities since emission spectra do not appreciably shift over the range of LED powers chosen in this design.

DESCRIPTION OF THE PREFERRED EMBODIMENTS

A test light source should provide a sizeable area of uniform light and a large numerical aperture (NA) for testing most microscope objectives. In general bar-type LEDs which contain plastic diffusers provide uniform light from circular regions directly over the internal LED chip. The amount of loss in light intensity from center to edge of a 1 mm spot will depend on the size of the chip, however this loss is typically less than 2%. The LEDs chosen for this source (HLMP light bar series, Quality Technologies, Sterling Va.) are designed to provide very even back lighting for displays. The LEDs are 0.35"×0.15" and red, yellow and green emitting versions are mounted side-by-side in a 1"×3"×0.5" box designed to be grasped in a slide holder above the microscope stage. If space above is limited, the holder can be mounted on a translator attached under the stage. The box is connected to a control module by a flexible cable.

Figure 1:
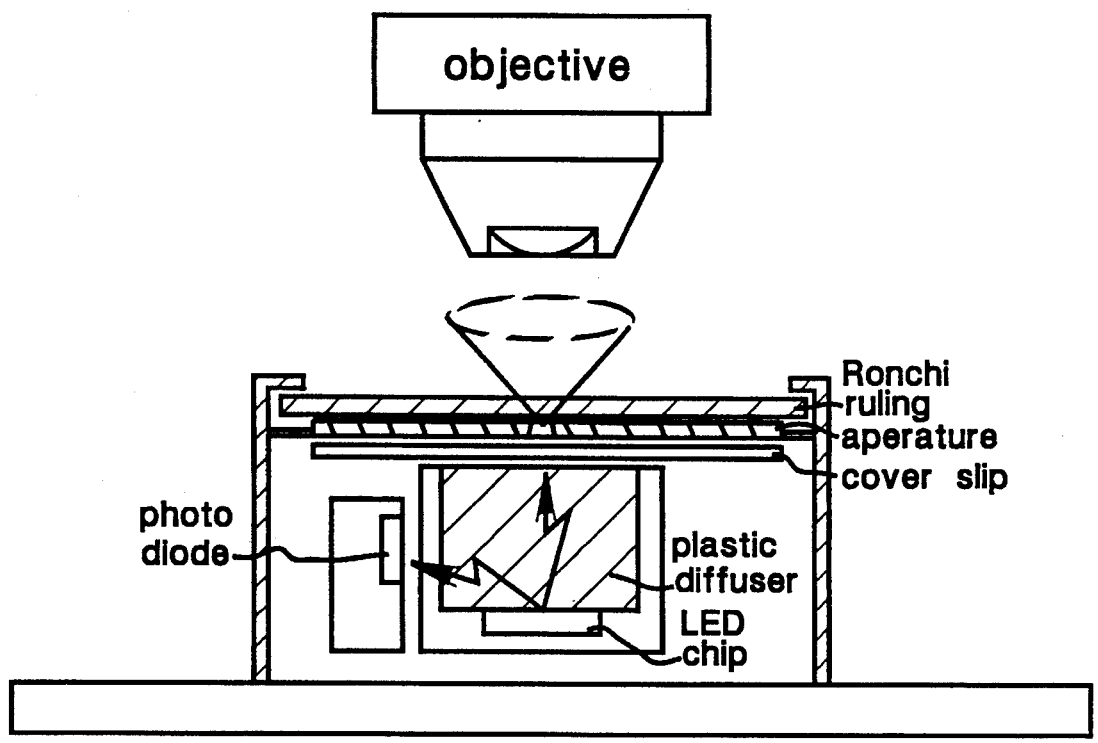
FIG. 1 is a schematic illustration of the apparatus of the instant invention, and shows an optical path.
Figure 2:
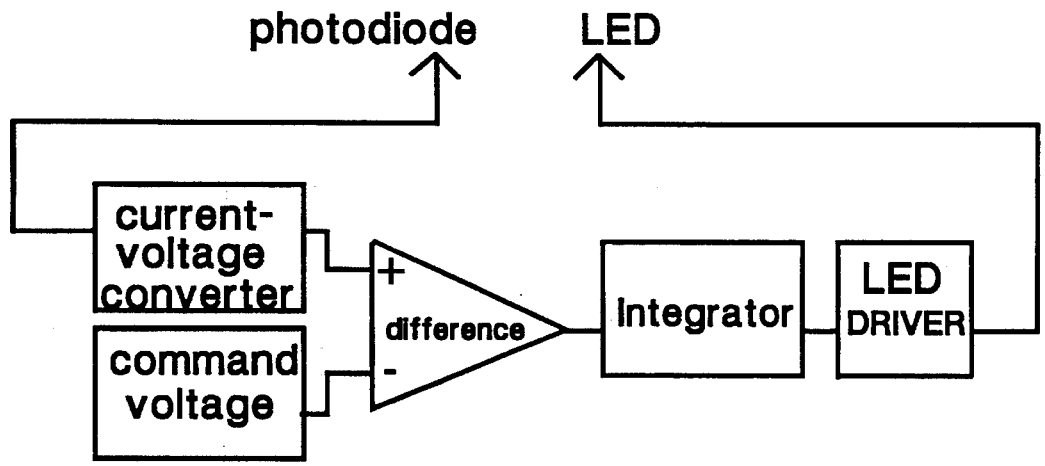
FIG. 2 is a block design of a control circuit for use with the apparatus of FIG. 1.

The optical path and the control path are shown in FIG. 1. As illustrated in FIG. 1, an aperture is placed directly over the LED chip passes a cone of uniformly intense light. A glass cover slip between the LED and aperture allows the surface of the LED to be blurred when focus is on the aperture plane as evident from FIG. 6. Rulings etched on glass slides can be inserted above the aperture. The light output is regulated to command settings with an integrating feedback controller which samples light from the side of the LED with a photodiode.

A large fraction of the LED light is scattered to the side and is sensed by a photodiode (Motorola MRD721) bonded to the diffuser with optical cement (Norland Products, type 60). Some LED indicators, including the one we chose to use, have an opaque seal which must be filed off to attach the photodiode. The photodiode signal provides feedback to a control circuit which regulates the LED output intensity. This method of regulation takes into account changes in LED conversion efficiency over time.

Figure 3:
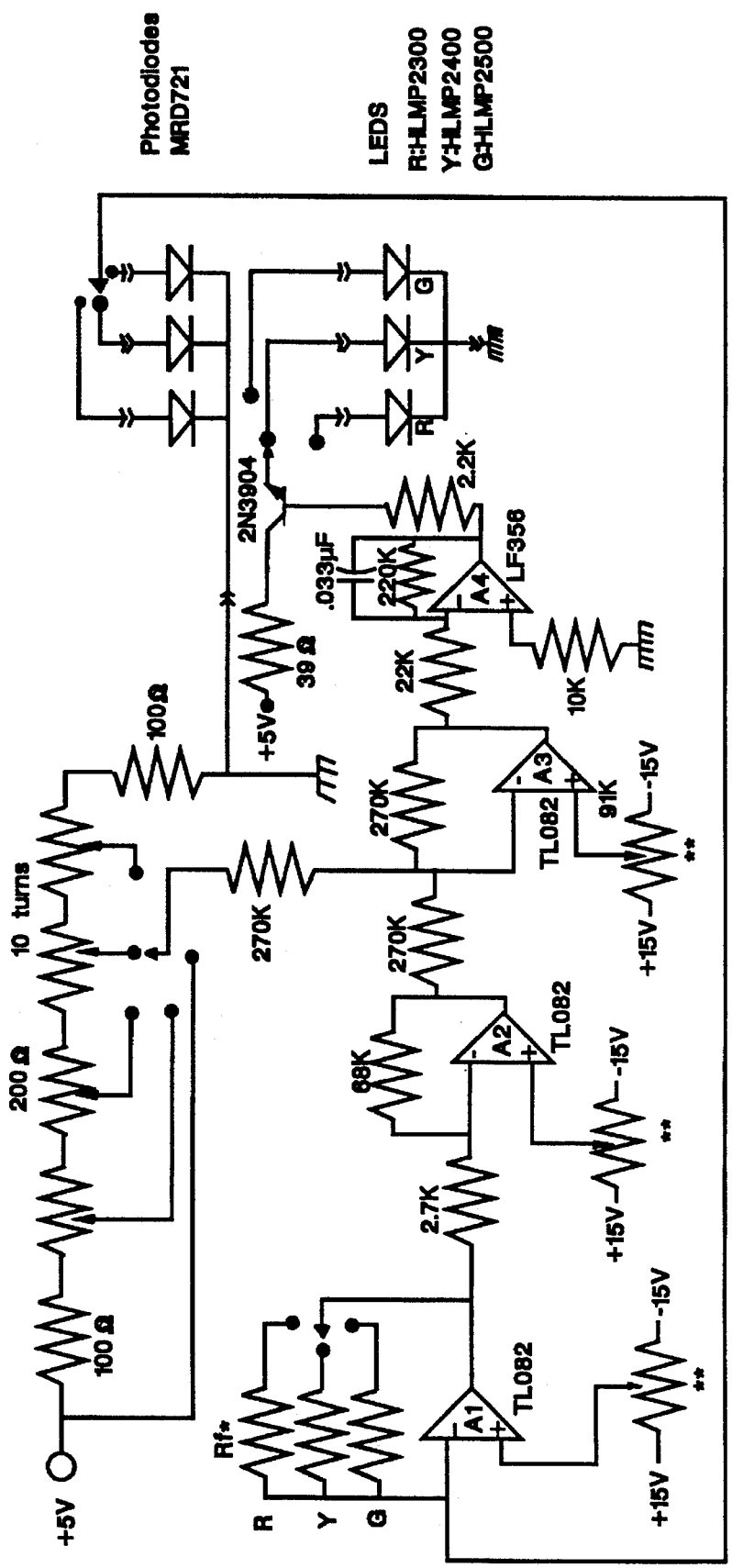
FIG. 3 is a circuit which provides optical feedback control of the LED output light intensity.

The circuit diagram and procedure for adjusting the circuit are shown in FIG. 3. The circuit of FIG. 3 provides optical feedback control of the LED output light intensity. Gating circuits are not shown, but are well known in the art. The value of the feedback resistor $R_f$ is switched for different LEDs to achieve similar intensity ranges. The circuit includes offset adjustment controls (series connected 4.7K ohm resistor, 100 ohm 10 turn trim-pot and 4.7k ohm resistor between +15 V and −15 V) for nulling the output dark voltage at photodiode op-amps A1 and A2 and the summing op-amp A3; these adjustments must be made if the feedback signal or command voltages are to be used to set output intensities. Nulling is accomplished with the LED source connected to the controller by first adding negative offset to A3 (turns LED off) and then adjusting the offset voltage of first A1 and then A2 to zero. The A3 offset is then adjusted until the A1 output just starts to increase and the LED output is not seen by eye. This adjustment sets the magnitude of the A2 output slightly less then the command voltage due to a small leakage current in the op-amp integrator A4, and causes the command voltage, feedback voltage and output intensity to be proportional.

The photodiode signal is amplified and inverted, and then summed with a command voltage. The error signal thus derived is integrated and applied to the base of a transistor in series with the LED power supply. This circuit modulates the LED input power such that the light intensity tracks the command level. The values of the feedback resistor and capacitor in the integrator stage cause the light output to settle within 200 microseconds after switching the command voltage. The light can be gated by externally pulsing the command voltage to test the response of continuous photodetectors, such as photomultipliers and photodiodes. Alternatively, the LED can be directly gated to provide unregulated on/off switching with faster settling times (approximately 10 microseconds).

Command voltages are trimmed to final values with a series of potentiometers. The levels can be set as desired, to values equally or unequally spaced depending on the type of testing required. The command voltages and photodiode signals appearing at the summing amplifier are in the range of 0–5 V and power supply instability is approximately 0.1% of this range. The small light current from the photodiodes requires a high gain current-to-voltage converter to obtain a five volt signal. Higher gain phototransistors should not be used because their response is not linear. The circuit accommodates differences in light conversion efficiency and photodiode response from each LED by selecting the current-to-voltage converter feedback resistor and the LED-photodiode with a common switch. The power supply uses 7812 and 7912 series i.c. regulators for +/−12 volts and a Zener reference diode for +5.1 volts. The power transformer is a side wound split bobbin type (Stancor SW-324) which significantly reduces line pickup by the high impedance circuit.

Spatially uniform output is obtained by masking the front surface of the diffuser with a 1 mm diameter aperture positioned directly over the internal chip, as shown in FIG. 1. This diameter nearly fills the field of view of a 10 X objective, thus higher magnifications will collect light from the center of the spot. To mask three colored LEDS positioned side-by-side, a thin sheet of 5 mil brass was carefully drilled at sites over the center of each LED and mounted to a 0.1 mm thick glass cover slip which is epoxied to the LED surfaces. The cover slip separates the surface and aperture so that focus at the aperture produces a blurred image of the LED surface, free from irregularities which could not be removed by polishing the plastic diffuser. Focusing exactly at the aperture insures both that a homogenous field is obtained and that the amount of light collected does not vary between measurements, which is critical for comparison of tests. The thin aperture produces minimal shading at the periphery of the image of the spot. The coverslip provides a solid stable base for the aperture, however it reduce the NA of the source since rays at high incidence angles are reflected. Since the LED used in this source is similar to diffused LED lamps for which the beam angle is specified at 130°, a significant amount of the light at angles above 41.8° should be attenuated by internal reflection in the cover slip. It turns out that, at least theoretically, the NA of the source is increased, but only a small amount, with the glass cover slip since $NA_{air}=\sin 65°= 0.906$ and $NA_{glass}=1.5\sin 41.8°= 0.99$. The actual beam angle of the assembled test source was estimated to be 74° by measuring the illumination vs radius at 10 mm from the LED surface. Although most bar-type indicators include two or more LED chips, only one chip should be activated. Flat-packaged photodiodes with sensing windows on the side, such as the ECE3035A and the Motorola MRD721, are easy to bond to the side of the LED. Test patterns such as square-wave rulings on etched slides (Ronchi rulings) can be inserted over the aperture to perform resolution tests with a flatly illuminated field.

The ability of the source to provide controlled light intensity and uniform illumination was tested. Photodiode responses (EG&G UV-444) to test illuminations are shown FIG. 4, using cleaned 35%, 50% and 75% T neutral density filters over the LED source set at 100% intensity (squares) and using a series of five preset LED intensities 20, 40, 60, 80 and 100% (circles). Light was collected through a Leitz inverted microscope (10 X/0.25 NA objective) and with the photodiode mounted at the camera port. A CCD camera response (Dage MTI model 72) to preset LED intensities (normalized at 100% intensity) is plotted as triangles. The camera was operated with gamma set to 1.0, using manual gain and auto black settings. The black reference was the dark surround of the calibration spot light which was centered in the field of a Zeiss upright microscope (3.5 X objective). Intensities were measured by integration over 21×21 pixels at the center of field (Image-1 analysis program, Universal Imaging Inc.), with the analog input level set to register dark at digital zero. The upper test intensity was approximately half of camera saturation.

Figure 4:
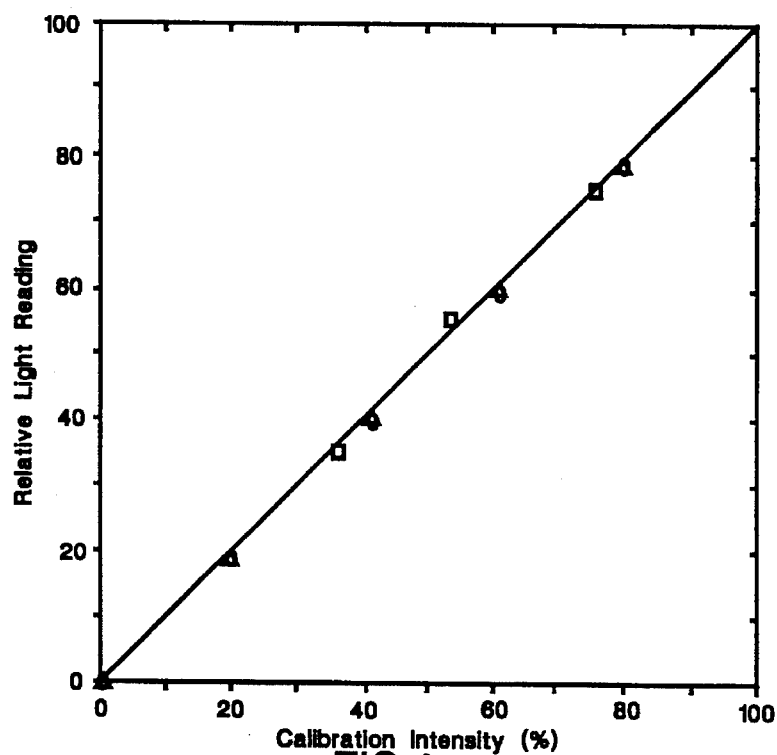
FIG. 4 shows photodiode responses to the test illuminations.

The optical feedback amplifiers were offset-trimmed before making measurements as shown in FIG. 4. The LED light outputs were preset to intensity levels of 20%, 40%, 60%, 80% and 100% of maximum output by adjusting the command voltage while monitoring light output with a linear photodiode detector (EG&G UV-444). The linearity of the detector was demonstrated using neutral density filters to attenuate the maximal intensity of the LED source. These results are shown in FIG. 4, along with the center field response of a CCD camera (Dage MTI model 72) at each command setting. These results confirmed both the camera and the LED source had linear characteristics.

The emission spectrum from the green LED at each output level was recorded with the CCD camera through a spectrograph. The command voltages were readjusted to 20%, 40%, 60%, 80% and 100% of the maximum reference voltage and compared to the optical feedback voltage and to the amplitude at the spectral peak and the total area of each spectrum, as summarized in Table I.

TABLE I

Comparison of command voltage, optical feedback voltage and green output light intensity.

| | Percent of maximum output | | | | | |
|---|---|---|---|---|---|---|
| | 0 | 20 | 40 | 60 | 80 | 100 |
| command voltage (V) | 0.00 | 1.025 | 2.05 | 3.075 | 4.10 | 5.125 |
| feedback voltage (V +/− 1 mV) | 0.05 | −0.992 | −1.997 | −3.002 | −4.005 | −4.999 |
| spectral peak intensity (0–255) | 0 | 17 | 36 | 54 | 73 | 90 |
| spectral integrated intensity | 0 | 6.57 | 13.62 | 20.67 | 27.79 | 35.48 |

Figure 5:
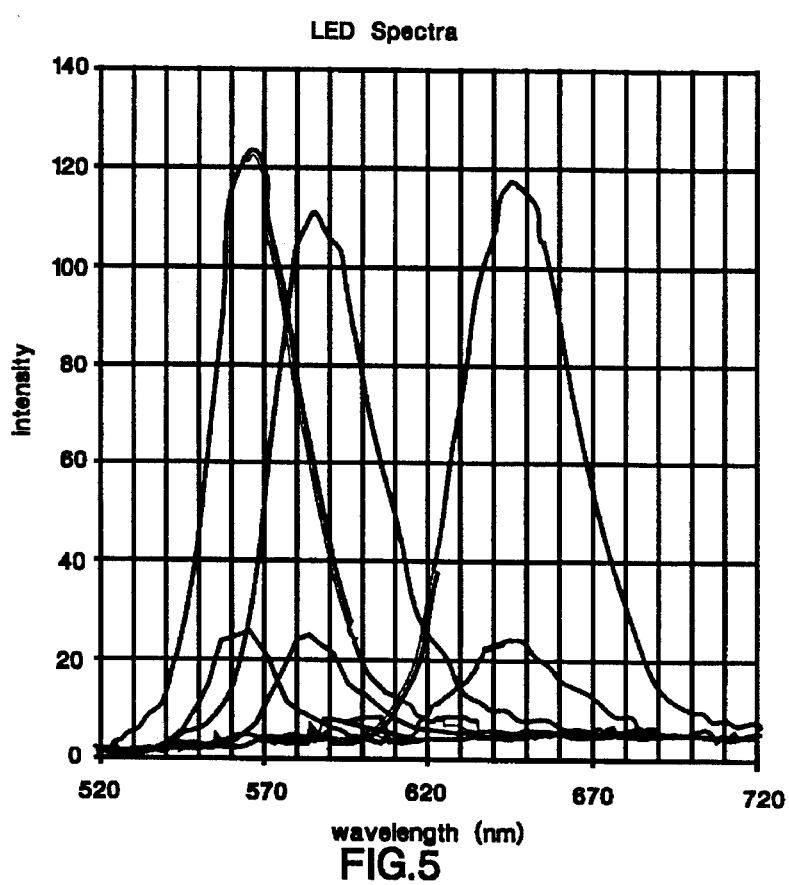
FIG. 5 is a plot of green, yellow and red LED emission spectra at maximum intensity and 20% of maximum intensity.

Green, yellow and red LED emission spectra at maximum intensity and 20% of maximum intensity are plotted in FIG. 5. Spectra were measured on an upright microscope (2.5 x objective) using a prism spectrograph coupled to an intensified CCD camera (Dage MTI GenIISys with model 72 CCD), and represent 256 averaged frames. The intensifier gain was adjusted to give approximately equal peak heights (100% intensities) which were within the linear response of the intensifier. The spectrograph wavelength axis was calibrated using recorded positions of Hg lamp lines and bandpass filter lines. Camera intensity response is not corrected.

Emissions from the yellow and green LEDS largely overlap while the red LED covers an independent spectral range. The power output level affects the light spectrum by a small amount; switching between the lowest and highest intensity caused modest increases in the peak wavelengths and the spectral bandwidths which are summarized in Table II. At higher intensities than those employed here, LED emission is shifted significantly toward red wavelengths. It should be noted that since spectral changes are modest, the output spectral bandwidth can be narrowed by placing filters over the LED surface without significantly changing the optical feedback properties and control.

TABLE II

Change in LED spectral parameters between low and high output intensity (0.5 nm precision).

| | Green | | Yellow | | Red | |
|---|---|---|---|---|---|---|
| | 20% | 100% | 20% | 100% | 20% | 100% |
| peak wavelength (nm) | 563 | — | 582 | — | 645 | — |
| peak shift (nm) | — | +2 | — | +2.5 | — | +1 |
| half-width (nm) | 30 | — | 36 | — | 42 | — |
| half-width change (nm) | — | +2 | — | +2 | — | +0.5 |

The optical power through the aperture of the green LED was measured with the 100 mm² sensing area of the EE&G photodiode set as close as possible to the source. At 7 mm, the full power was 30.7 Iwatts with step sizes of 6.15 Iwatts. These values are determined from the sensor response vs wavelength curve and gain of the current-to-voltage converter. A power level of 34 Iwatts was estimated with a foot-candle meter after scaling its reading by the the area of the meter window relative to 1 ft². When viewed at low magnification (1–10 X), the LED power output is adequate to test the light response of most cameras.

Figure 6:
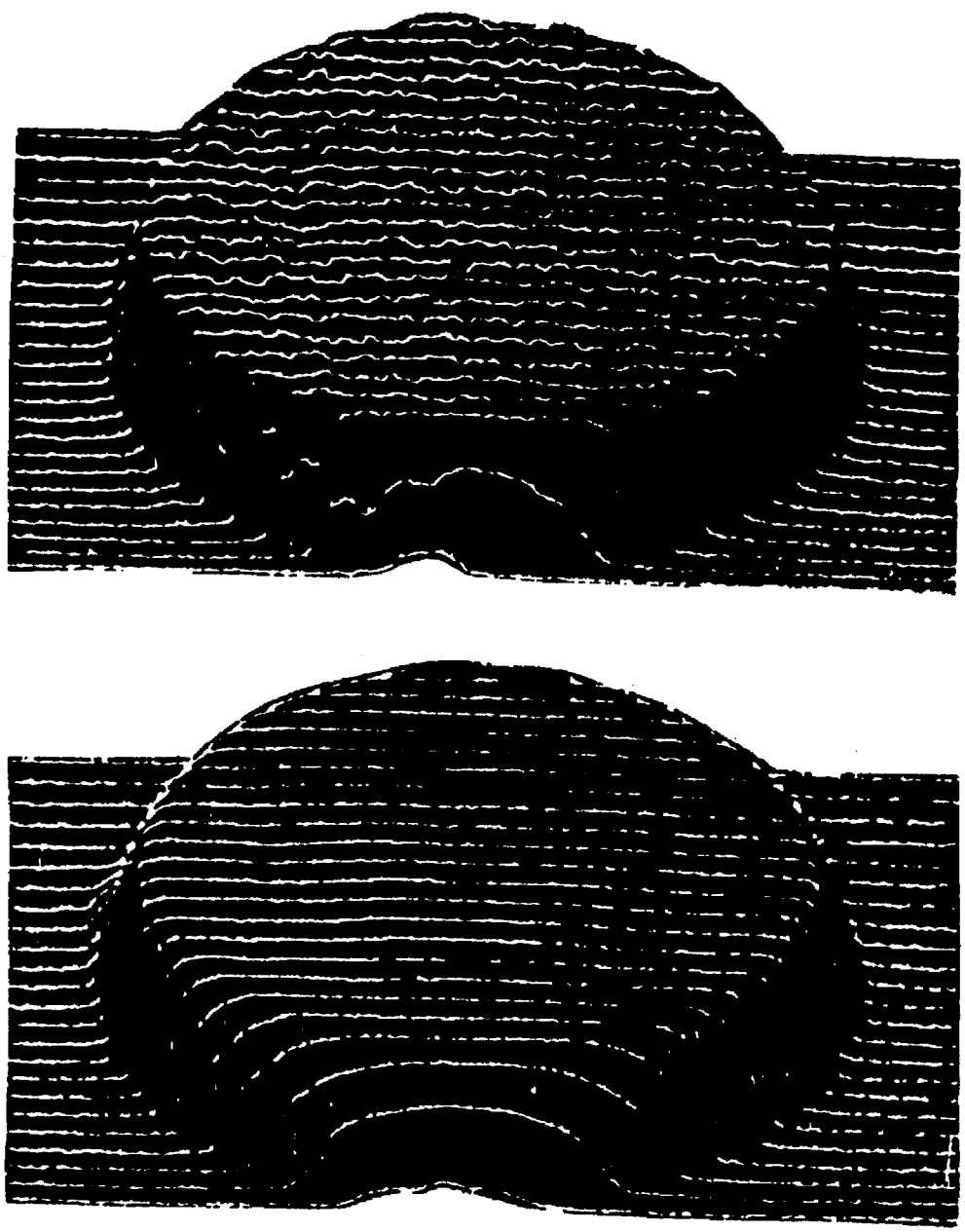
FIG. 6 shows plots of linear scans of intensity through images of the green LED spot illumination.

Plots of linear scans of intensity through images of the green LED spot illumination are shown in FIG. 6. Images were acquired with a CCD camera on an upright microscope (2.5 x objective) and averaged 256 x (Image-1) at planes corresponding to the surface of the diffuser (top image), and the surface of the aperture (bottom image).

Figure 7:
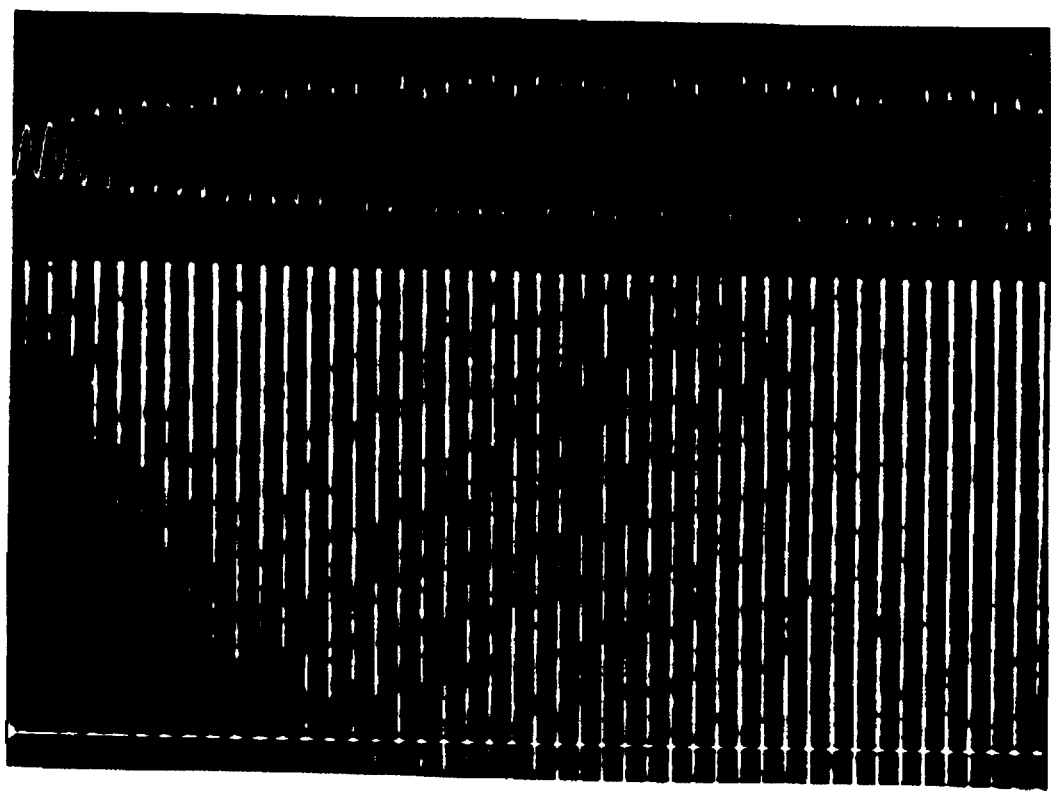
FIG. 7 shows in the top panel, an intensity line scan though the image of a 100 lp/mm Ronchi ruling, and in the bottom panel shows an averaged image of ruling and location of line scan.

The top panel of FIG. 7, shows an intensity line scan though the image of a 100 lp/mm Ronchi ruling (Edmund Scientific) backlit by illumination from the green LED and recorded with a CCD camera using a 10 X/0.25 NA objective lens. With this objective, approximately 60% of the spot diameter was recorded by the camera. The amplitude of light lines (crests) decreases slowly from center to edge while dark amplitude (troughs) decreases near the edge of the field. The bottom panel of FIG. 7 shows an averaged image of ruling and location of line scan shown as a horizontal white line.

What is claimed is:

1. A light calibration device comprising diffused LED light source, control means to provide feedback control of intensity, said control means including a photodiode positioned to detect output light intensity from said diffused LED source, light diffuser means, said diffused LED source being encapsulated in said diffuser means, whereby the light from said LED light source is homogenized and a flat field of illumination is obtained.

2. The light calibration device of claim 1, wherein said LED source comprises a plurality of LEDS mounted side-by-side and which are individually selectable, whereby spectral coverage extends between 550 nm and 670 nm.

3. The light calibration device of claim 1, wherein said LED light source includes green, yellow and red light producing LEDs.

4. The light calibration device of claim 1, wherein said LED source is a plurality of LED chips encapsulated in plastic diffusers, whereby the light from said LED chips is homogenized and a flat field of illumination is obtained.

5. The light calibration device of claim 1, further comprising a thin aperture member positioned directly over said diffused LED light source, the aperture diameter of said aperture member being on the order of about 1 mm.

6. The light calibration device of claim 5, further comprising a transparent member positioned over said aperture, said transparent member having Ronchi rulings to enable measurements of contrast modulation in a uniform field.

7. The light calibration device of claim 1, wherein said light is pulse-modulated to assess camera response times.

8. The light calibration device of claim 1, wherein said device is synchronized with video frames.

9. The light calibration device of claim 1, wherein said diffused LED source is in the focal plane of a microscope objective lens.

10. The light calibration device of claim 9, further comprising narrow bandpass interference filters between said microscope objective lens and said LED source, whereby monochromatic light is produced without affecting the spacing of controlled light intensities.

11. A light calibration device comprising an LED light source, control means to provide feedback control of intensity, said control means including a photodiode positioned to detect output light intensity from said LED source, said LED light source is at least one chip, and a thin aperture member positioned directly over each of said at least one chip, the aperture diameter of said aperture member being on the order of about 1 mm.

12. The light calibration device of claim 11, wherein said LED source comprises a plurality of LEDS mounted side-by-side and which are individually selectable, whereby spectral coverage is extended.

13. The light calibration device of claim 12, wherein said LED light source includes green, yellow and red light producing LEDs.

14. The light calibration device of claim 11, further comprising a transparent member positioned over the aperture, said transparent member having Ronchi rulings to enable measurements of contrast modulation in a uniform field.

15. The light calibration device of claim 11, wherein said light is pulse-modulated to assess camera response times.

16. The light calibration device of claim 11, wherein said device is synchronized with video frames.

17. A microscope having light calibration device, comprising an LED light source, control means to provide feedback control of intensity, said control means including a photodiode positioned to detect output light intensity from said LED source, said LED light source is at least one chip, and a microscope objective lens, said LED source being in the focal plane of said microscope objective lens.

18. The microscope having light calibration device, of claim 17, further comprising narrow bandpass interference filters, said narrow bandpass interference filters being between said microscope objective lens and said LED source, whereby monochromatic light is produced without affecting the spacing of controlled light intensities.

19. The microscope having light calibration device, of claim 17, further comprising light diffuser means, said diffused LED source being encapsulated in said diffuser means, whereby the light from said LED light source is homogenized and a flat field of illumination is obtained.

20. The microscope having light calibration device, of claim 19, further comprising a thin aperture member positioned directly over said diffused LED light source, the aperture diameter of said aperture member being on the order of about 1 mm.

* * * * *